(12) United States Patent
Splittstoesser

(10) Patent No.: US 11,361,544 B2
(45) Date of Patent: Jun. 14, 2022

(54) SYSTEMS AND METHODS FOR DETERMINING BUILDING DAMAGE

(71) Applicant: State Farm Mutual Automobile Insurance Company, Bloomington, IL (US)

(72) Inventor: Lynn Splittstoesser, Bloomington, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 628 days.

(21) Appl. No.: 15/601,055

(22) Filed: May 22, 2017

(65) Prior Publication Data

US 2018/0336418 A1   Nov. 22, 2018

(51) Int. Cl.
| | |
|---|---|
| G06Q 40/08 | (2012.01) |
| G06V 20/00 | (2022.01) |
| G06Q 50/16 | (2012.01) |
| G06K 9/62 | (2022.01) |
| G06Q 10/00 | (2012.01) |
| G06V 20/10 | (2022.01) |

(52) U.S. Cl.
CPC ........... *G06V 20/39* (2022.01); *G06K 9/6201* (2013.01); *G06Q 50/16* (2013.01); *G06Q 10/20* (2013.01); *G06Q 40/08* (2013.01); *G06V 20/176* (2022.01)

(58) Field of Classification Search
CPC .. G06K 9/00704; G06K 9/6201; G06V 20/39; G06V 20/176; G06Q 50/16; G06Q 10/20; G06Q 40/08
See application file for complete search history.

(56) References Cited

U.S. PATENT DOCUMENTS

| | | | |
|---|---|---|---|
| 8,346,578 B1* | 1/2013 | Hopkins, III | G06Q 50/16 |
| | | | 705/14.66 |
| 8,749,381 B1 | 6/2014 | Maroney et al. | |
| 8,756,085 B1 | 6/2014 | Plummer et al. | |
| 8,874,454 B2 | 10/2014 | Plummer et al. | |
| 9,098,655 B2 | 8/2015 | Plummer et al. | |
| 9,121,779 B2 | 9/2015 | Martin | |
| 9,152,863 B1 | 10/2015 | Grant | |
| 9,262,564 B2 | 2/2016 | Plummer et al. | |
| 9,633,146 B2 | 4/2017 | Plummer et al. | |
| 10,032,226 B1* | 7/2018 | Suizzo | G06Q 10/10 |
| 10,169,856 B1* | 1/2019 | Farnsworth | G06V 10/42 |

(Continued)

OTHER PUBLICATIONS

Pinelli, Jean-Paul; Emil Simiu; Kurt Gurley; et al. "Hurricane Damage Prediction Model for Residential Structures," Journal of Structural Engineering. (Nov. 2004), p. 1685-1691.*

(Continued)

*Primary Examiner* — Elizabeth H Rosen
(74) *Attorney, Agent, or Firm* — Armstrong Teasdale LLP

(57) ABSTRACT

A damage assessment (DA) computing device for determining building damage may be provided. The DA computing device may retrieve historical damage data associated with roof damage from a historical damage database, generate a damage model based upon the retrieved historical damage data, identify an building for a roof damage assessment, retrieve damage data associated with the building, compare the damage data associated with the roof to the damage model, and/or determine a damage status of the roof based upon the comparison.

28 Claims, 6 Drawing Sheets

(56) References Cited

U.S. PATENT DOCUMENTS

| | | | |
|---|---|---|---|
| 10,733,671 B1* | 8/2020 | Hakimi-Boushehri | G06Q 10/10 |
| 2007/0038484 A1* | 2/2007 | Hoffner | G06Q 40/08 705/4 |
| 2007/0168155 A1* | 7/2007 | Ravela | G01W 1/10 702/179 |
| 2009/0265193 A1* | 10/2009 | Collins | G06Q 30/0185 901/46 |
| 2013/0317861 A1* | 11/2013 | Tofte | G06Q 40/08 705/4 |
| 2015/0302529 A1* | 10/2015 | Jagannathan | G06Q 40/08 705/4 |
| 2015/0356686 A1* | 12/2015 | Cook | G06Q 40/08 705/4 |
| 2016/0048925 A1 | 2/2016 | Emison et al. | |
| 2016/0239921 A1 | 8/2016 | Bray et al. | |
| 2017/0032466 A1* | 2/2017 | Feldman | G06Q 50/16 |
| 2017/0176640 A1* | 6/2017 | Kodra | G01W 1/10 |

OTHER PUBLICATIONS

"How Predictive Modeling Has Revolutionized Insurance," Insurance Journal (Jun. 18, 2012).*

Heneka, Patrick; Bodo Ruck. "A Damage Model for the Assessment of Storm Damage to Buildings," Engineering Structures, (Jul. 17, 2008), p. 3603-3609.*

"How Predictive Modeling Has Revolutionized Insurance," Insurance Journal (Jun. 18, 2012). (Year: 2012).*

Heneka, Patrick; Bodo Ruck. "A Damage Model for the Assessment of Storm Damage to Buildings," Engineering Structures, (Jul. 17, 2008), p. 3603-3609. (Year: 2008).*

* cited by examiner

SYSTEMS AND METHODS FOR DETERMINING BUILDING DAMAGE

FIELD OF THE DISCLOSURE

The present disclosure relates to determining building damage and, more particularly, to systems and methods for determining roof damage of a building based upon a historical damage data.

BACKGROUND

A roof and/or other structural components of a building may be susceptible to damage during storms and/or other damaging conditions. For example, a hail storm may impact a roof of a building. The hail may create impact holes in the roof and/or structurally weaken the roof. The roof may also be susceptible to other damaging conditions that are not directly related to weather, such as tree limbs falling on the roof. When damage to the roof is suspected, a homeowner and/or other occupant of the building may contact an insurance provider and/or other third party to determine the extent of damage to the roof. Based upon the damage, an insurance claim may be responsible for paying to repair or replace the roof.

To determine damage to a roof, in at least some known systems, a representative of the insurance provider (or other third party) may visit the building. The representative may assess the damage to the roof by analyzing a particular portion of the roof. In at least some embodiments, the representative may be required to climb onto or near the roof to assess the damage. In some cases, the damage to the roof may be extensive and may cause the roof to be unable to support the representative, which may increase the risk of potential injuries. Multiple representatives may visit the building together to reduce the risk of potential injuries at the building. Moreover, scheduling in-person visits to a building with suspected roof damage may be time-consuming and may extend the time needed to process an insurance claim for the roof damage.

BRIEF SUMMARY

The present embodiments may relate to a damage assessment (DA) system for assessing potential damage to roofs and/or other structural components of a building. The DA system may include a DA computing device. The DA computing device may generate a damage model for buildings based on historical damage retrieved from a historical damage database. The damage model may be used as a reference to determine whether damage to a building has occurred and/or to what extent has damage to the building occurred. The DA computing device may perform a damage assessment process for a building when an insurance claim may be received and/or when the DA computing device detects an inclement weather condition in a geographic region that includes the building. The DA computing device may retrieve damage data associated with the building. The damage data may include data associated with the weather, the environment (e.g., trees), and/or the building itself. The DA computing device may compare the damage data to the damage model to determine the potential damage for the building. In the exemplary embodiment, the DA computing device may determine a damage status of the building and/or a component of the building (e.g., a roof). The determined damage status may be used to generate, process, and/or resolve the insurance claim for the building. The determined damage status may be used to determine other courses of action to repair or replace the damaged building component.

In one aspect, a DA computing device for determining roof damage of a building may be provided. The DA computing device may include at least one processor and a memory communicatively coupled to the processor. The processor may be programmed to retrieve historical damage data that is associated with roof damage and includes a plurality of historical damage parameters from a historical damage database, generate a damage model based upon the retrieved historical damage data, identify an building for a roof damage assessment, retrieve damage data that is associated with a roof of the building and includes a plurality of damage parameters, compare the damage data associated with the roof to the damage model, and/or determine a damage status of the roof based upon the comparison.

In another aspect, a computer-based method for determining damage of a roof may be provided. The method may be at least partially performed by a DA computing device. The method may include retrieving historical damage data that is associated with roof damage and includes a plurality of historical damage parameters from a historical damage database, generating a damage model based upon the retrieved historical damage data, identifying an building for a roof damage assessment, retrieving damage data that is associated with a roof of the building and includes a plurality of damage parameters, comparing the damage data associated with the roof to the damage model, and/or determining a damage status of the roof based upon the comparison.

In yet another aspect, at least one non-transitory computer-readable storage media having computer-executable instructions embodied thereon may be provided. When executed by at least one processor, the computer-executable instructions may cause the processor to retrieve historical damage data that is associated with roof damage and includes a plurality of historical damage parameters from a historical damage database, generate a damage model based upon the retrieved historical damage data, identify an building for a roof damage assessment, retrieve damage data that is associated with a roof of the building and includes a plurality of damage parameters, compare the damage data associated with the roof to the damage model, and/or determine a damage status of the roof based upon the comparison.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
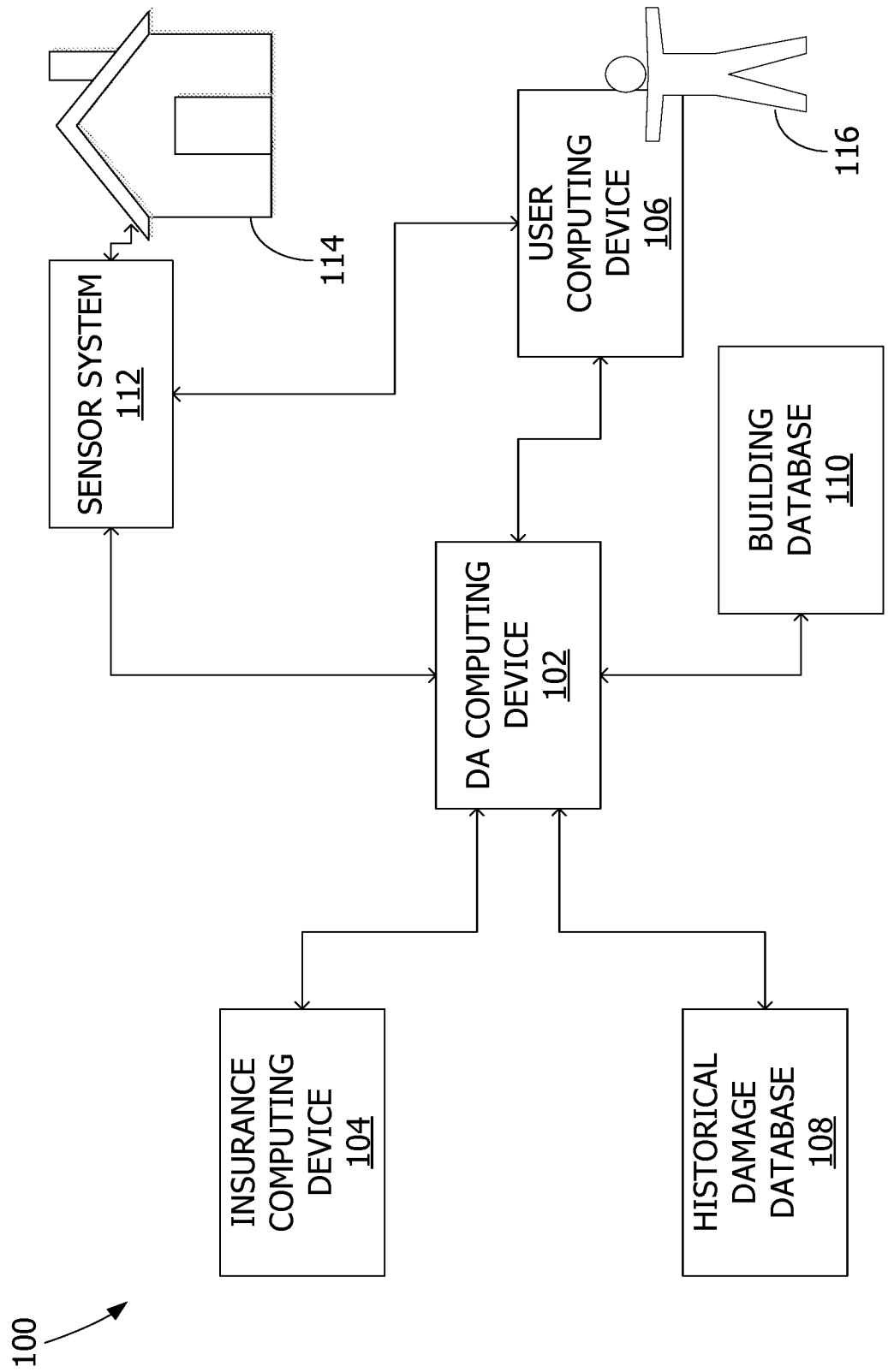
FIG. 1 illustrates a block diagram of a damage assessment (DA) system for determining damage to a building.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for determining building damage, and more specifically, determining roof damage for buildings based upon historical damage data.

Although the systems and methods may be described herein for determining roof damage, the systems and methods described herein may be used to determine other damage to buildings, such as, but not limited to, foundation damage, wall damage, window damage, and/or other structural damage to buildings. The roof damage is used for exemplary purposes only, and is not intended to limit the scope of the embodiments described herein.

In the exemplary embodiment, a damage assessment (DA) system may be provided for determining building damage, and more specifically, determining damage to a roof of a building. The DA system may include a DA computing device. The DA computing device may include at least one processor and a memory communicatively coupled to the at least one processor. The DA computing device may be configured to identify potential roof damage based upon collected data associated with a building and its environment, particularly for buildings that may have experienced inclement weather conditions (e.g., hail, wind, tornadoes, etc.). In some embodiments, the DA computing device may be associated with an insurance provider that provides insurance policies for buildings. Identifying potential roof damage based upon data that may be collected with limited in-person inspection may facilitate improved processing speed of insurance claims associated with roof damage. In other embodiments, the DA computing device may be associated with other parties.

In the exemplary embodiment, the DA computing device may be communicatively coupled to a historical damage database storing historical damage data. In other embodiments, the DA computing device may be integrally formed with the historical damage database. The historical damage data may be associated with historical incidents of building damage. In one example, the historical damage database may receive the historical damage data from insurance providers and/or other parties in response to insurance claims filed for building damage. The historical damage data may include at least some damage data associated with roof damage.

The historical damage data may include a plurality of historical damage parameters. Each historical damage parameter for a particular incident of building damage may provide information regarding the building and/or the environment of the building at the time of the damage incident. For example, and without limitation, the historical damage parameters may include, weather parameters, building parameters, and/or environment parameters. Weather parameters may indicate weather conditions associated with the damage. In one example, if a hail storm caused the damage, the weather parameters may include hail size, duration of the hail storm, wind speed, wind direction, and/or other information related to the hail or wind conditions. The weather parameters may also include information associated with weather conditions of the building over a predetermined period of time. The weather parameters may be collected from publically available and/or commercially available data sources. Building parameters may indicate information associated with the building and its structural components, such as, but not limited to, age of the roof, material type of the roof, angle or slant of the roof, and/or other building information. Environment parameters may indicate information about an environment surrounding the building that may affect potential damage to the building. For example, the environment parameters may include, without limitation, tree coverage of the building, height of surrounding buildings, and/or other environment information. Building parameters and/or environment parameters for historical damage may be provided by users and/or historical insurance claims for damage incidents. In certain embodiments, the historical damage parameters may include other information about a damage incident, such as insurance information and/or a damage status of the building. As used herein, a "damage status" may indicate whether or not the building is damaged and to what extent it is damaged. In one example, the damage status may be "no damage", "repairs recommended", and/or "totaled" (i.e., the cost to repair the damage is greater than the cost to replace the damage component of the building).

In the exemplary embodiment, the DA computing device may be configured to retrieve historical damage data from the historical damage database. In particular, the DA computing device may be configured to retrieve historical damage data associated with roof damage. The DA computing device may then generate a damage model for calculating roof damage using the retrieved historical damage data. The damage model may be configured to be used as a reference for determining a damage status of roofs as described herein. In the exemplary embodiment, the damage model includes a plurality of model parameters that correspond to the historical damage parameters. In other embodiments, the damage model may be generated in a different format. For example, the damage model may be a function for receiving damage parameters for a roof and generating an output for determining a damage status of the roof. The DA computing device may be configured to generate the damage model by analyzing the historical damage data. The DA computing device may be configured to perform a statistical analysis of the historical damage parameters to generate the damage model. For example, for a particular type of damage parameter, the DA computing device may average the corresponding historical damage parameters together to generate a model parameter. In other embodiments, the DA computing device may be configured to perform a different analysis that is suitable to generate the damage model.

The DA computing device may be configured to store the damage model. In some embodiments, the damage model may be stored in the memory of the DA computing device. In other embodiments, the damage model is stored in the historical damage database for subsequent retrieval.

In at least some embodiments, the DA computing device may be configured to generate one or more damage thresholds associated with the damage model. The damage thresholds define a plurality of ranges between the thresholds that may be used to determine a damage status of a roof as described herein.

In the exemplary embodiment, the DA computing device may be configured to perform a damage assessment process. During the damage assessment process, the DA computing device may analyze damage data associated with roofs to determine if the roofs have been damaged and to what extent. The DA computing device may be configured to provide information associated with the roof damaged to an insurance provider associated with an insurance policy of the damage building to facilitate processing an insurance claim for the damage. In some embodiments, the DA computing device may be communicatively coupled to one or more insurance computing devices associated with one or more insurance providers. The insurance computing devices may be configured to receive, generate, and/or otherwise process insurance claims. In other embodiments, the DA computing device may be an insurance computing device.

The DA computing device may be configured to initiate the damage assessment process in response to more than one trigger condition. The damage assessment process may be initiated proactively (i.e., prior to an insurance claim being filed) and/or reactively (i.e., in response to a filed insurance claim). In at least some embodiments, the DA computing device may be configured to monitor weather data associated with weather conditions for a geographic region to proactively initiate the damage assessment process. The weather data may be stored in a weather database and/or transmitted by a computing device. The weather database may be configured to collect and store weather data for one or more geographic regions. The geographic region may be an area that is identifiable within the weather data. For example, the geographic region may be, but is not limited to, a continent, a country, a state, a zip code, a town or city, a neighborhood, a street, geographical coordinates, and/or other identifiable geographic regions. The DA computing device may detect inclement weather that may cause damage to roofs and/or other building components, such as hail and/or wind. When the DA computing device detects inclement weather in a geographic region, the DA computing device may be configured to detect buildings within the geographic region that may be susceptible to potential damage.

In at least some embodiments, the DA computing device may be communicatively coupled to a building database. The building database may be configured to store building profiles associated with a plurality of buildings. The building profiles may include information about the buildings and particular components of the buildings (e.g., roofs). In one example, a building profile may include, but is not limited to, an age of the building's roof, a material of the roof, tree coverage of the building, and/or a slant or angle of the roof. The building profile may also include an address or location of the building and/or contact information for a building owner, occupant, and/or other user associated with the building (e.g., an insurance policyholder). The building profiles may include data retrieved from one or more users and/or data retrieved from one or more insurance claims associated with the buildings. In some embodiments, at least some building data of the building profiles may be collected through image data, such as, and without limitation, image date from satellites and/or drones. The image data may be processed using image processing to extract the building data. In certain embodiments, the building database may be associated with an insurance provider. In such embodiments, the building profiles stored in the building database may be associated with buildings that are insured by insurance policies provided by the insurance provider. In other embodiments, a different party may be associated with the building database, such as a government organization.

The DA computing device may be configured to detect or identify buildings within the geographic region with inclement weather. The DA computing device may then collect damage data associated with buildings within the geographic region to determine if the buildings are susceptible to roof damage and/or other damage. In the exemplary embodiment, the DA computing device retrieves damage parameters from the building profile of the building in the geographic region, such as building parameters and/or environment parameters. The DA computing device may also retrieve damage parameters from the weather data. In at least some embodiments, the DA computing device may be configured to prompt a user associated with the building to provide damage parameters. In such embodiments, the DA computing device may be communicatively coupled to a user computing device associated with the user. The DA computing device may transmit prompts and/or questions to the user computing device for display to the user. The user may answer the prompts and/or questions and transmit a response back to the DA computing device. In certain embodiments, the user computing device may be configured to capture image data, video data, and/or audio data of the building and transmit the data to the DA computing device for analysis. The DA computing device may be configured to perform image and/or audio analysis on the received data to extract damage parameters from the data. That is, the DA computing device may be configured to detect points of interests from the data and extract damage parameters by analyzing the points of interest. Additionally or alternatively, the DA computing device may be configured to retrieve damage data for a building from other suitable data sources.

In some embodiments, the building may include a sensor system for monitoring the building. The sensor system may include one or more sensors that collect sensor data associated with the building. In certain embodiments, at least some sensors may be integrated within structural components of the building. For example, a roof may include integral sensors that monitor the roof. Additionally or alternatively, some sensors may be remote from the building. For example, sensors of a satellite and/or drone may collect sensor data associated with the building. At least some of the sensors may be configured to collect sensor data that may be used by the DA computing device as damage parameters. For example, a sensor may be configured to monitor a roof for impacts (e.g., impacts from hail). The sensor may provide damage parameters including the number of impacts, force of impacts, the locations of the impacts, and/or other impact-related information. The sensor system may be communicatively coupled to the DA computing device to transmit the sensor data as damage parameters. The sensor system may include a computing device in communication with the DA computing device. In other embodiments, the sensor system may be communicatively coupled to a different computing device (e.g., the user computing device) that retrieves the sensor data. In such embodiments, the DA computing device may retrieve the sensor data from the computing device.

The DA computing device may retrieve the damage model for comparison to the collected damage data. The comparison may indicate how similar the potential damage to the building is to other, historical building damage incidents. In the exemplary embodiment, the DA computing device compares each damage parameter of the damage data for the building to a corresponding model parameter of the damage model. In some embodiments, the DA computing device may be configured to calculate a difference and/or a normalized difference between the damage parameters and the corresponding model parameter. In some embodiments, a parameter score may be generated for each damage parameter based upon the comparison. The parameter score may indicate a likelihood that damage occurred and/or an extent of the damage based upon the parameter score. Parameter scores may be calculated for each damage parameter. A confidence score may be generated at least partially as a function of the parameter scores. The confidence score may account for each damage parameter and provides a quantitative confidence level that damage has or has not occurred and/or to what extent damage has occurred. Alternatively, the confidence score may be generated using other suitable techniques based upon the comparison of the damage parameters and the damage model. In one example, if the damage model is a function or set of functions, the damage parameters may be provided as input into the functions. The parameter scores and/or the confidence score may be generated as outputs of the functions of the damage model.

In at least some embodiments, the confidence score may be compared to the damage thresholds to determine a damage status for the building. The score ranges defined by the damage thresholds may be associated with different damage statuses. The DA computing device may determine which score range includes the confidence score and assign a corresponding damage status to the building. In one example, the damage thresholds for roof damage may define a first score range associated with a damage status of "limited roof damage", a second score range associated with a damage status of "repairs recommended", and a third score range associated with a damage status of "totaled roof". In some embodiments, a score range may be associated with a plurality of damage statuses. The DA computing device may select a relevant damage status based upon the damage parameters, the confidence score, and/or other data associated with the building. In other embodiments, the DA computing device may be configured to determine the damage status of a building using other suitable techniques based upon the comparison of the damage parameters and the damage model.

The determined damage status may then be transmitted to the user associated with the building. Contact information for the user may be retrieved from the building profile of the building, contact information provided for an insurance policy of the building, and/or other data sources that store contact information. In the exemplary embodiment, the DA computing device may transmit the determined damage status to the user. In certain embodiments, the DA computing device may transmit a recommendation to the user with the damage status. The recommendation may provide one or more recommended courses of actions in response to the damage status of the roof. For example, if the damage status indicates the roof requires repairs or is totaled, the recommendation may recommend the user file an insurance claim for the damage. In some embodiments, the recommendation may include a link and/or other identifier that may be used to initiate an insurance claim for the roof. That is, the user provides user input indicating his or her approval to initiate an insurance claim. The insurance claim may be automatically generated based at least partially upon the damage parameters, the damage status, and/or other stored data associated with the building. The insurance claim may then be automatically processed.

In the exemplary embodiment, the damage assessment process may also be initiated in response to an insurance claim submitted by the user. The DA computing device identifies the building associated with the insurance claim and retrieves damage data associated with the building. The DA computing device may then compare the damage data of the building to the damage model to determine the damage status of the building. The DA computing device may be configured to update the insurance claim to include the damage status and/or the damage parameters for processing. In some embodiments, the DA computing device and/or an insurance computing device may automatically process and resolve the insurance claim when the insurance claim is updated.

In certain embodiments, the damage parameters, the parameter scores, the confidence score, and/or the damage status may be stored by one or more computing devices and/or databases. In one example, the damage status and the damage parameters may be stored in the building profile in the building database. The damage model may be updated to include the damage parameters of the building such that the damage model may be refined over repeated uses.

At least one of the technical problems addressed by this system may include: (i) time-consuming and labor-intensive field inspections of building damage; (ii) unsafe inspection areas (e.g., totaled roofs); (iii) extended processing time for insurance claims for building damage; and (iv) limited quantitative analysis of roof damage relative to historical data from other roofs.

A technical effect of the systems and processes described herein may be achieved by performing at least one of the following steps: (a) retrieving historical damage data that is associated with roof damage from a historical damage database and includes a plurality of historical damage parameters; (b) generating a damage model based upon the retrieved historical damage data; (c) storing the damage model; (d) identifying a building with potential damage caused at least partially by inclement weather; (e) retrieving damage data associated with a roof of the building, the damage data including a plurality of damage parameters; (f) comparing the damage data to the stored damage model; (g) determining a damage status of the roof based upon the comparison; and/or (h) initiating and/or processing an insurance claim based at least partially upon the determined damage status.

The technical effect achieved by this system may be at least one of: (i) limiting the amount of field inspections for building damage; (ii) proactive identification of roof damage; (iii) reducing processing time for insurance claims for building damage; (iv) increased quantitative analysis of roof damage in comparison to historical roof damage; and (v) reducing the risk of potential risk of injury to a representative inspecting a roof for damage, thereby potentially reducing the amount of workers compensation provided by the insurance provider due to injury.

Exemplary Damage Assessment {DA} System

FIG. 1 depicts an exemplary DA system 100 for determining roof damage of buildings. System 100 may include a DA computing device 102, an insurance computing device 104, a user computing device 106, a historical database 108, a building database 110, and/or a sensor system 112. In other embodiments, system 100 may include additional, fewer, or alternative devices, including those described elsewhere herein.

DA computing device 102 may be communicatively coupled to insurance computing device 104, user computing device 106, historical database 108, building database 110, and/or sensor system 112. DA computing device 102 may be configured to perform a damage assessment process for one or more buildings 114 as described herein.

Insurance computing device 104 may be associated with an insurance provider and/or another party associated with insurance policies. In the exemplary embodiment, insurance computing device 104 may be associated with an insurance provider associated with an insurance policy for building 114. Building 114 may be any type of building, such as a residential building, a commercial building, and/or an industrial building. In certain embodiments, system 100 may include a plurality of insurance computing devices 104 that are communicatively coupled to DA computing device 102 and are associated with a plurality of insurance providers. Insurance computing device 104 may be in communication with DA computing device 104 to transmit and/or receive data associated with insurance claims.

User computing device 106 may be associated with a user or a group of users. In the exemplary embodiment, user computing device 106 may be associated with an insurance policyholder 116. Policyholder 116 may be identified as an insured by the insurance policy for building 114. In other embodiments, user computing device 106 may be associated with a different user, such as, but not limited to, a building owner and/or an occupant (e.g., a renter or a leasee). User computing device 106 may be in communication with DA computing device 102 to provide data to DA computing device 102 for the damage assessment process and/or to provide policyholder 116 with information from DA computing device 102. In some embodiments, user computing device 106 may be in communication with insurance computing device 104 to facilitate filing an insurance claim for building damage. In certain embodiments, user computing device 106 is associated with the insurance provider. That is, an insurance agent may monitor user computing device 106 for information associated with potential damage to insured buildings as described herein. In response to the information, the insurance agent may contact policyholder 116 and/or a different user proactively to determine if policyholder 116 would like to file an insurance claim for the damage, thereby reducing the time needed to initiate and resolve an insurance claim.

Historical damage database 108 may be configured to store historical damage data associated with reported damage incidents for one or more buildings. In the exemplary embodiment, historical damage database 108 may be communicatively coupled to DA computing device 102 and/or insurance computing device 104 to receive historical damage data. In some embodiments, historical damage database 108 may be configured to receive historical damage data from a different data source. The historical damage data may include a plurality of historical damage parameters for each historical incident. In the exemplary embodiment, DA computing device 102 may be configured to retrieve the historical damage data from historical damage database 108 and generate a damage model based upon the historical damage data.

Building database 110 may be configured to store building data associated with a plurality of buildings (including building 114). The building data may provide information regarding the buildings and structural components of the buildings (e.g., roofs). The building data may include, and without limitation, dimensions, building materials, angles, age of components, previous damage, tree coverage, historical weather data, and/or other information associated with buildings. In at least some embodiments, the building data may identify an owner of the building and/or contact information for the building owner. The building data may be received by building database 110 from, for example, DA computing device 102, insurance computing device 104, user computing device 106, and/or sensor system 112. Additionally or alternatively, the building data may be received from a different computing device (not shown). In one example, the building data may be fly-over image data collected by a satellite, a drone, and/or another aircraft. The image data may be various types of image data, such as, but not limited to, photo image data, infrared image data, ultrasound image data, and/or other types of image data. The building data may be extracted from the fly-over image data using image processing techniques. DA computing device 102 may be configured to access building database 110 and retrieve building data as described herein.

Sensor system 112 may be configured to collect sensor data associated with building 114. Sensor system 112 may include one or more sensors (not shown in FIG. 1). The sensors may be configured to collect different types of sensor data, such as, but not limited to, force data, tension data, motion data, strain data, electrical data, chemical data, optical data, audible data, and/or other data types that may be collected by sensors. In at least some embodiments, one or more sensors may be installed on and/or integrated with building 114. Additionally or alternatively, one or more sensors may collect sensor data associated with building 114 remotely, such as sensors installed on a drone and/or a satellite monitoring building 114. In the exemplary embodiment, at least some sensors may be configured to collect sensor data associated with a roof of building. Sensor system 112 may be configured to transmit the sensor data to DA computing device 102, insurance computing device 104, and/or user computing device 106.

Exemplary Data Flow for DA Systems

Figure 2:
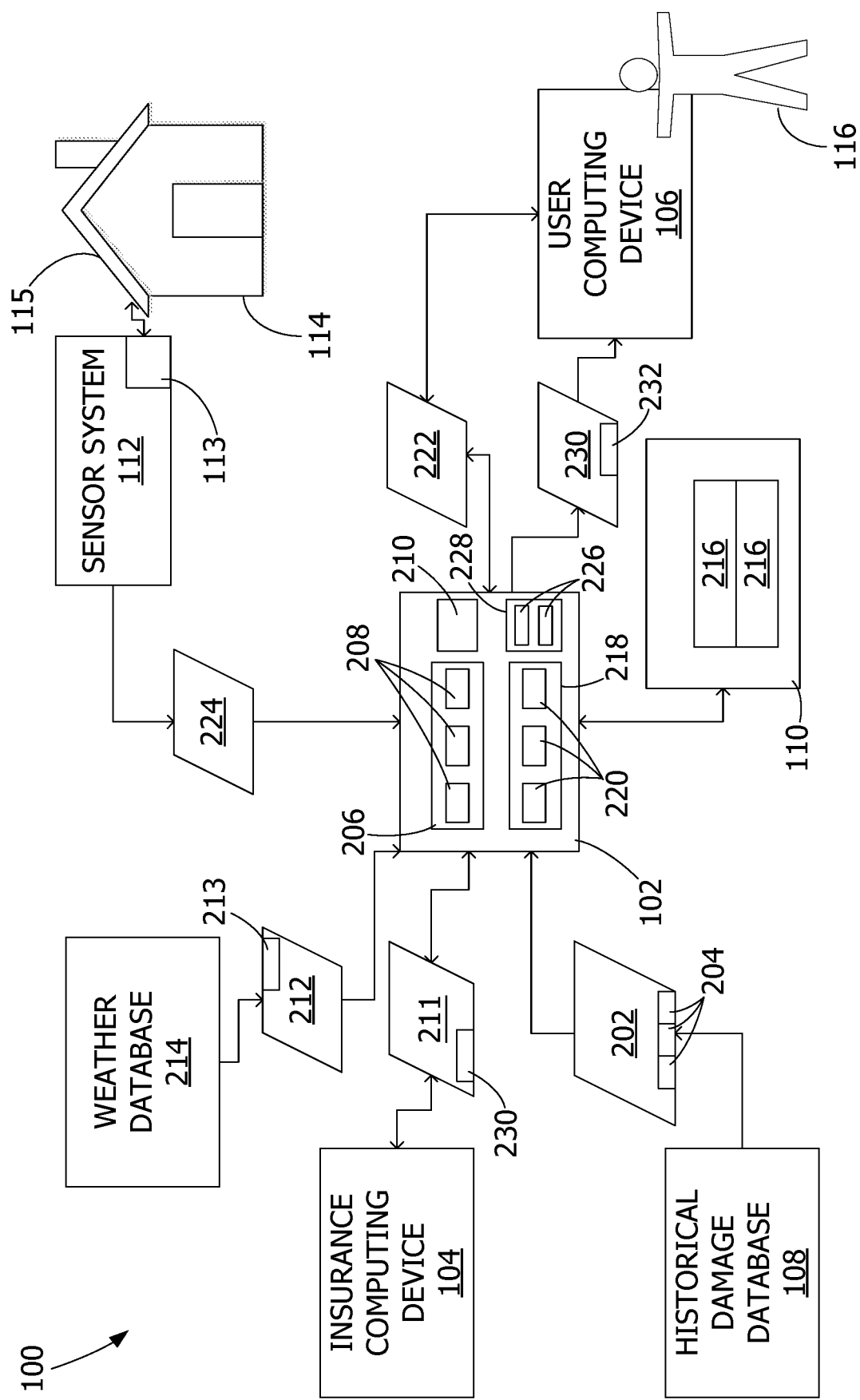
FIG. 2 illustrates a data flow diagram of a damage assessment process that may be used with the system shown in FIG. 1.

FIG. 2 depicts an exemplary data flow diagram of a damage assessment process that may be used with DA system 100 (shown in FIG. 1). In other embodiments, the damage assess process may include additional, fewer, or alternative steps, including those described elsewhere herein.

In the exemplary embodiment, DA computing device 102 may be configured to retrieve historical damage data 202 from historical damage database 108. Historical damage data 202 may be data associated with historical building damage incidents. For each damage incident, historical damage data 202 may include one or more historical damage parameters 204. Each historical damage parameter 204 may provide information about the damage incident and the conditions of the building. In at least some embodiments, historical damage parameters 204 may include weather parameters, building parameters, environment parameters (e.g., tree coverage of the building), and/or other parameters that may provide information about the building and/or the damage incident.

DA computing device 102 may receive historical damage data 202 and generate a damage model 206 based at least partially upon historical damage data 202. Damage model 206 may be a statistical model that may be used as a reference to determine if a roof has been damaged and/or to what extent damage to the roof has occurred. Damage model 206 may be generated from historical damage data 202 using any suitable analysis and/or statistical technique. In the exemplary embodiment, damage model 206 may include a plurality of model parameters 208 for comparing individual damage parameters to determine damage as described herein. In other embodiments, damage model 206 may be in a different format, such as a function or a set of functions.

In the exemplary embodiment, DA computing device 102 may generate one or more damage thresholds 210 based upon historical damage data 202 and/or damage model 206. Damage thresholds 210 may be used to identify a damage status of a roof based upon an output of damage model 206. In particular, damage thresholds 210 may define a plurality of score ranges between each threshold 210 and the output boundaries of damage model 206. Comparing an output of damage model 206 to the score ranges defined by damage thresholds 210 may enable DA computing device 102 to determine a damage status of a roof as described herein. In the exemplary embodiment, damage model 206 and/or damage thresholds 210 may be stored in DA computing device 102. In other embodiments, damage model 206 and/or damage thresholds 210 may be stored in a different database and/or computing device for retrieval, such as historical damage database 108.

In the exemplary embodiment, DA computing device 102 may be configured to begin the damage assessment process for a roof 115 of building 114 in response to detecting inclement weather in a geographic region that includes building 114, receiving an insurance claim 211 for roof 115, and/or other trigger conditions that may indicate potential damage to roof 115. In one example, DA computing device 102 may be notified by sensor system 112 that roof 115 has potentially been damaged.

Prior to receiving an insurance claim 211, in at least some embodiments, DA computing device 102 may be configured to retrieve weather data 212 from a weather database 214. Weather database 214 may store weather data 212 for one or more geographic regions. Weather data 212 may be publically and/or commercially available weather data collected by weather database 214 for storage. The geographic regions may include, for example, continents, countries, states, cities, zip codes, towns, neighborhoods, streets, and/or other identifiable geographic regions. Weather data 212 may provide information regarding current and/or historical weather for the geographic regions. For example, if a geographic region is experiencing a hail storm, weather data 212 may indicate an average hail size, a speed of the hail storm, wind speeds, and/or other information regarding the hail storm. Weather data 212 may also include location data 213 to identify a location or geographic region associated with weather data 212. DA computing device 102 may be configured to monitor weather data 212 to detect inclement weather conditions for a geographic region. If inclement weather is detected for the geographic region, DA computing device 102 may determine if any buildings are within the region that are eligible for the damage assessment process. In one example, eligibility may be determined by whether or not the building is insured by an insurance provider associated with DA computing device 102 and/or insurance computing device 104.

DA computing device 102 may be configured to access building database 110 and determine if any buildings are within the geographic region identified by location data 213 when inclement weather is detected. In the exemplary embodiment, building database 110 may store a plurality of building profiles 216 for a plurality of buildings. Each building profile 216 may store building data associated with a respective building. Building profile 216 may include a location or address of the respective building. DA computing device 102 may detect building 114 is within the geographic region with the inclement weather condition and is eligible for the damage assessment process based upon a building profile 216 of building 114. DA computing device 102 may then initiated the damage assessment process for roof 115 of building 114.

In the exemplary embodiment, DA computing device 102 may be configured to collect or retrieve damage data 218 associated with roof 115. Damage data 218 may include one or more damage parameters 220 that may provide information regarding roof 115 and/or the environment of roof 115. Damage parameters 220 may be retrieved from one or more data sources. For example, a set of damage parameters 220 may be retrieved from weather data 212. DA computing device 102 may retrieve a set of damage parameters 220 from building profile 216 of building 114. In another example, DA computing device 102 may transmit a prompt to user computing device 106 for display to policyholder 116. Policyholder 116 may provide user input 222 including a set of damage parameters 220 in response to the prompt. User input 222 may include, but is not limited to, text data, image data, video data, and/or audio data. In one example, policyholder 116 may capture image data of roof 115 with user computing device 106 and/or another sensor or computing device. In one example, a drone and/or a satellite may be used to capture image data of roof 115. DA computing device 102 may be configured to receive the image data and perform image analysis on the image data to extract damage parameters 220, such as a slant or angle of roof 115, visible damage to roof 115, and/or the like. That is, DA computing device 102 may be configured to automatically detect components, features, and/or other points of interests associated with roof 115 and/or building 114 In another example, user computing device 106 may display one or more questions to policyholder 116. Policyholder 116 may then provide user input 222 in response to the questions.

In certain embodiments, DA computing device 102 may receive sensor data 224 including a set of damage parameters 220 from sensor system 112. More specifically, sensor system 112 may include one or more roof sensors 113 configured to monitor roof 115. In one example, at least one roof sensor 113 may be integrated with roof 115 to monitor impacts on roof 115. That is, roof sensors 113 may monitor an area of roof 115 (e.g., a square meter of roof 115) for impact forces. Sensor data 224 may be collected for each impact force within the area of roof 115 that exceeds a predetermined threshold. In another example, at least one roof sensor 113 may be configured to monitor strain, curvature of roof 115, and/or other measureable information associated with roof 115. Roof sensors 113 may generate sensor data 224 for transmittal to DA computing device 102.

When damage data 218 is collected, DA computing device 102 may compare damage data 218 to damage model 206. More specifically, in the exemplary embodiment, DA computing device 102 may compare damage parameters 220 with corresponding model parameters 208. DA computing device 102 may be configured to compare damage parameters 220 and model parameters 208 using any suitable comparison technique. In one example, DA computing device 102 may calculate a difference between each damage parameter 220 and the corresponding model parameter 208. In another example, DA computing device 102 may calculate a normalized difference for each damage parameter. In the exemplary embodiment, DA computing device 102 may generate a parameter score 226 for each damage parameter comparison. Parameter score 226 may indicate if the corresponding damage parameter 220 is similar parameters for historical damage incidents. DA computing device 102 may be configured to generate a confidence score 228 for building 114 based at least partially upon parameter scores 226. Confidence score 228 indicates a likelihood that damage has occurred to roof 115 and/or to what extent damage has occurred to roof 115. DA computing device 102 may combine, aggregate, and/or other compute using parameters scores 226 to generate confidence score 228. In other embodiments, DA computing device 102 may generate confidence score 228 without parameter scores 226. In one example, damage model 206 may be a function that receives damage data 218 as an input to generate confidence score 228. In another example, confidence score 228 may be extrapolated from the comparison of damage model 206 and damage data 218 of building 114.

Confidence score 228 may then be compared to damage thresholds 210 to determine a damage status of roof 115. DA computing device 102 may be configured to detect which score range includes confidence score 228. In the exemplary embodiment, each score range includes one or more associated damage statuses. In one example, for confidence scores 228 generated on a percentage scale, a confidence score 228 between 70% and 100% may have a corresponding damage status of "totaled". A confidence score 228 between 40% and 70% may have corresponding damage statuses of "repairs recommended" and/or "in-person inspection recommended". A confidence score 228 below 40% may have a corresponding damage status of "limited damage" or "no damage". Damage thresholds 210 (e.g., 40% and 70%) may be included in either adjacent score range or define separate score ranges. In other embodiments, different damage thresholds 210 and/or different damage statuses may be implemented by DA computing device 102.

In the exemplary embodiment, DA computing device 102 may notify policyholder 116 of a damage status 230 determined for building 114. DA computing device 102 may transmit damage status 230 to user computing device 106 for display. Based upon damage status 230, policyholder 116 may take actions to repair or replace roof 116. In some embodiments, damage status 230 may be transmitted to user computing device 106 with one or more recommendations 232. Recommendation 232 may be configured to recommend a course of action for policyholder 116 to resolve damage indicated by damage status 230. In at least some embodiments, recommendation 232 may recommend to file an insurance claim 211 for roof 115. In such embodiments, insurance claim 211 is not automatically generated and/or stored in response to the determined damage status 230 to enable policyholder 116 to determine whether or not he or she wants to file claim 211. In one example, policyholder 116 may not file claim 211 and instead funds maintenance costs on roof 115 personally (or through a third party other than the insurance provider). In response to recommendation 232, policyholder 116 may provide user input indicating approval of the recommended course of action. When DA computing device 102 receives approval in response to recommendation 232, DA computing device 102 may automatically initiate the course of action. For example, if the recommended course of action is to file an insurance claim 211 for building 114, DA computing device 102 may automatically generate (or cause insurance computing device 104 to generate) an insurance claim 211 for roof 115.

Insurance claim 211 may include data from the damage assessment process, such as, but not limited to, building profile 216, damage data 218, parameter scores 226, confidence scores 228, damage status 230, and/or recommendation 232. Insurance claim 211 may be automatically processed by the insurance provider to facilitate reduced processing time of insurance claims 211.

In certain embodiments in which user computing device 106 is associated with an insurance agent of the insurance provider, the insurance agent analyzes damage status 230 and/or any other data received from DA computing device 102. The insurance agent may contact policyholder 116 (or another user associated with building 114) to provide the agent's analysis with damage status 230. The agent may then ask policyholder 116 if he or she wants to file insurance claim 211 for the damage. Based on the response of policyholder 116, the agent may generate and process insurance claim 211 and/or perform other insurance-related tasks for roof 115.

In the exemplary embodiment, in addition to initiating the damage assessment process prior to insurance claim 211, DA computing device 102 may be configured to initiate the damage assessment process in response to an insurance claim 211 received for roof 115. That is, policyholder 116 may have submitted insurance claim 211. DA computing device 102 may receive insurance claim 211 from insurance computing device 104 and/or user computing device 106. DA computing device 102 may detect which building is associated with the received insurance claim 211 to begin the damage assessment process. After damage status 230 is determined, DA computing device 102 may automatically update insurance claim 211 with damage status 230 and/or other data to facilitate resolving insurance claim 211. In some embodiments, DA computing device 102 may process and/or resolve insurance claim 211. In other embodiments, insurance computing device 104 may process and/or resolve the updated insurance claim 211.

Exemplary User Computing Device

Figure 3:
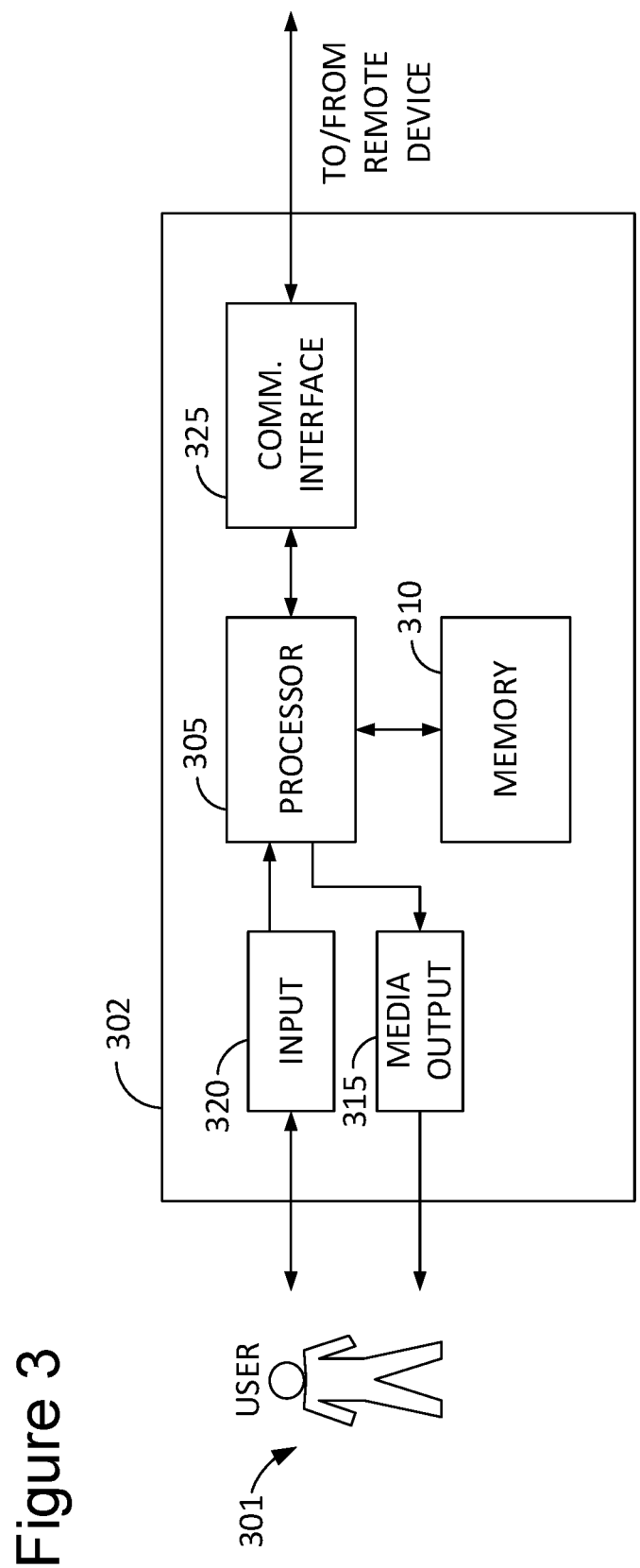
FIG. 3 illustrates an exemplary configuration of a user computer device, in accordance with one embodiment of the present disclosure.

FIG. 3 depicts an exemplary configuration of a user computing device, in accordance with one embodiment of the present disclosure. User computing device 302 may be operated by a user 301. User computing device 302 may include, but is not limited to, DA computing device 102, insurance computing device 104, and user computing device 106 (all shown in FIG. 1). User computing device 302 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or transaction data to be stored and retrieved. Memory area 310 may include one or more computer readable media.

User computing device 302 may also include at least one media output component 315 for presenting information to user 301. Media output component 315 may be any component capable of conveying information to user 301. In some embodiments, media output component 315 may include an output adapter (not shown) such as a video adapter and/or an audio adapter. An output adapter may be operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 may be configured to present a graphical user interface (e.g., a web browser and/or a client application) to user 301. A graphical user interface may include, for example, an interface for viewing prompts and damage statuses 230 (shown in FIG. 2). In some embodiments, user computing device 302 may include an input device 320 for receiving input from user 301. User 301 may use input device 320 to, without limitation, provide user input 222.

Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

User computing device 302 may also include a communication interface 325, communicatively coupled to a remote device such as DA computing device 102 (shown in FIG. 1). Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or a client application. Web browsers enable users, such as user 301, to display and interact with media and other information typically embedded on a web page or a website from DA computing device 102 and/or insurance computing device 104. A client application may allow user 301 to interact with, for example, DA computing device 102. For example, instructions may be stored by a cloud service, and the output of the execution of the instructions may be sent to the media output component 315.

Exemplary Host Computing Device

Figure 4:
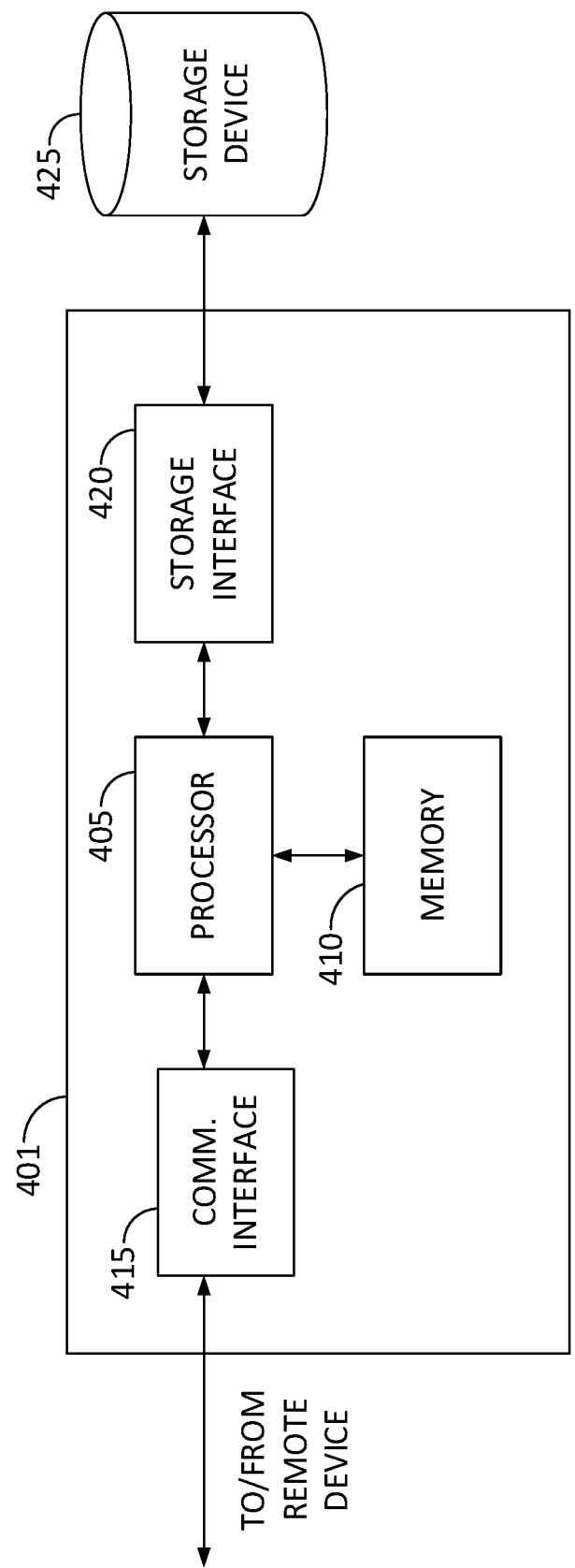
FIG. 4 illustrates an exemplary configuration of a host computing device, in accordance with one embodiment of the present disclosure.

FIG. 4 depicts an exemplary configuration of a host computing system, in accordance with one embodiment of the present disclosure. Host computing device 401 may include, but is not limited to, DA computing device 102 and insurance computing device 104 (both shown in FIG. 1). Host computing device 401 may also include a processor 405 for executing instructions. Instructions may be stored in a memory area 410. Processor 405 may include one or more processing units (e.g., in a multi-core configuration).

Processor 405 may be operatively coupled to a communication interface 415 such that host computing device 401 is capable of communicating with a remote device, such as another host computing device 401 and/or a user computing device 302 (shown in FIG. 3), for example, using wireless communication or data transmission over one or more radio links or digital communication channels. For example, communication interface 415 may receive damage data 218 as illustrated in FIG. 2.

Processor 405 may also be operatively coupled to a storage device 425. Storage device 425 may be any computer-operated hardware suitable for storing and/or retrieving data, such as, but not limited to, data associated with databases 108, 110, and 214 (shown in FIGS. 1 and 2). In some embodiments, storage device 425 may be integrated in host computing device 401. For example, host computing device 401 may include one or more hard disk drives as storage device 425.

In other embodiments, storage device 425 may be external to host computing device 401 and may be accessed by a plurality of host computing devices 401. For example, storage device 425 may include a storage area network (SAN), a network attached storage (NAS) system, and/or multiple storage units such as hard disks and/or solid state disks in a redundant array of inexpensive disks (RAID) configuration.

In some embodiments, processor 405 may be operatively coupled to storage device 425 via a storage interface 420. Storage interface 420 may be any component capable of providing processor 405 with access to storage device 425. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 425.

Processor 405 may execute computer-executable instructions for implementing aspects of the disclosure. In some embodiments, the processor 405 may be transformed into a special purpose microprocessor by executing computer-executable instructions or by otherwise being programmed. For example, the processor 405 may be programmed with instructions such as illustrated in FIG. 5.

Exemplary Computer-Implemented Method for Assessing Roof Damage

Figure 5:
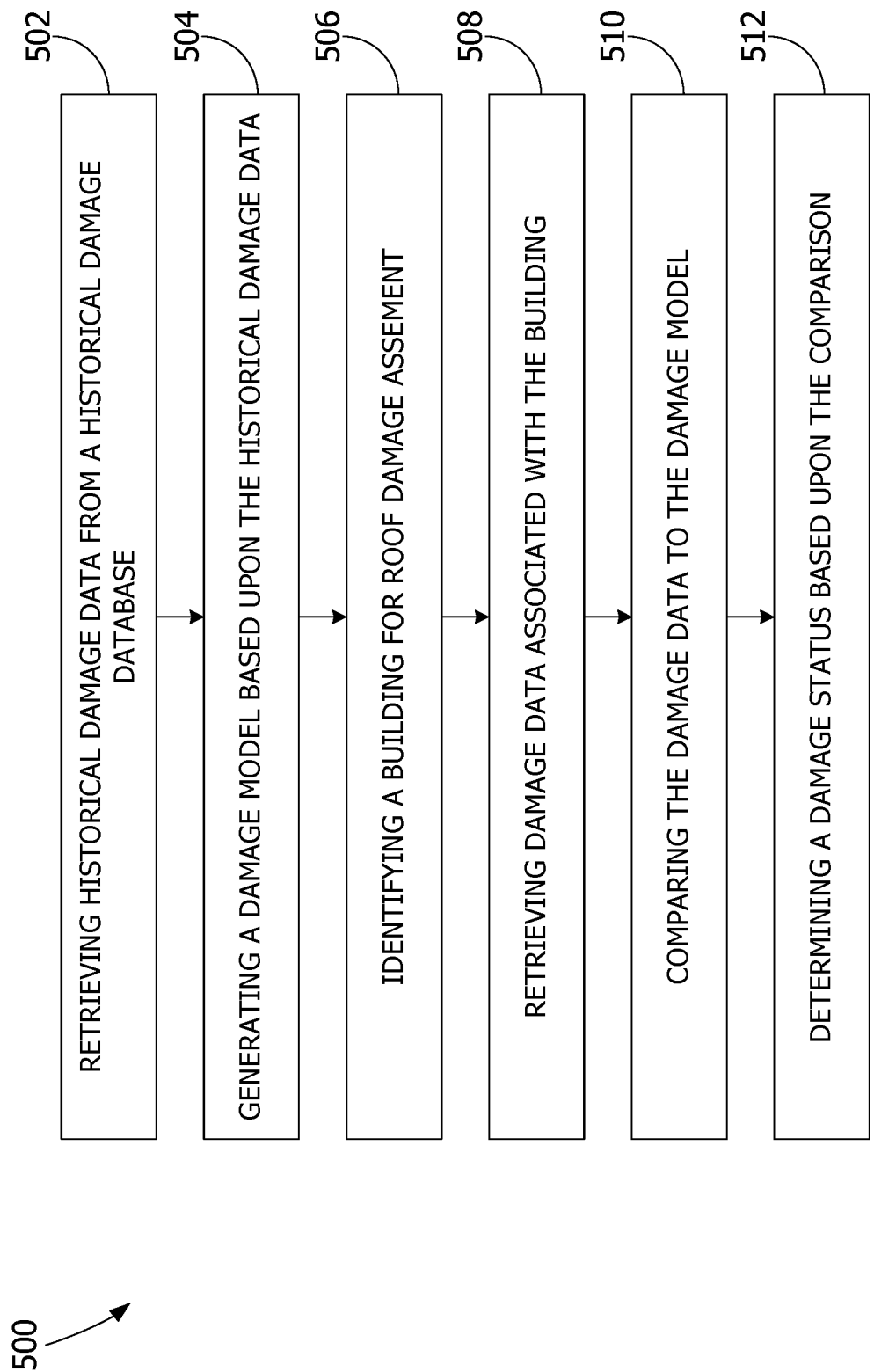
FIG. 5 illustrates a flow diagram of an exemplary method for assessing roof damage that may be used with the system shown in FIG. 1.

FIG. 5 depicts an exemplary method 500 for assessing roof damage that may be used with system 100 (shown in FIG. 1). Method 500 may be at least partially performed by DA computing device 102 (shown in FIG. 1). In certain embodiments, method 500 may be at least partially performed by another computing device, such as insurance computing device 104 (shown in FIG. 1). In other embodiments, method 500 may include additional, fewer, or alternative steps, including those described elsewhere herein.

With respect to FIGS. 1 and 5, method 500 may begin with DA computing device 102 retrieving 502 historical damage data from historical damage database 108. DA computing device 102 may generate 504 a damage model based upon the historical damage data. In certain embodiments, the damage model may include a plurality of model parameters. The damage model may be stored by DA computing device 102 to facilitate subsequent access during a damage assessment process for a building.

DA computing device 102 may identify 506 building 114 for roof damage assessment. In some embodiments, DA computing device 102 may identify 506 building 114 based up a received insurance claim associated with building 114 and/or determining building 114 is within a geographic region having inclement weather conditions that may result in building damage. DA computing device 102 may retrieve 508 damage data associated with building 114 for one or more data sources, such as, and without limitation, insurance computing device 104, user computing device 106, building database 110, sensor system 112, and/or weather database 214 (shown in FIG. 2). The damage data may include a plurality of damage parameters associated with building 114. DA computing device 102 may compare 510 the damage data to the damage model. In some embodiments, DA computing device 102 may compare the damage parameters of the damage data to the model parameters of the damage model. In at least some embodiments, DA computing device 102 may generate a confidence score for building 114 based upon the comparison 510. DA computing device 102 may determine 512 a damage status of a roof of building 114 based at least partially upon the comparison 510.

In certain embodiments, DA computing device 102 may compare the confidence score to one or more damage thresholds to determine the damage status. The determined damage status may be transmitted to a user associated with building 114 (e.g., policyholder 116) and/or an insurance provider associated with an insurance policy for building 114. In some embodiments, DA computing device 102 may automatically generate and/or process an insurance claim based at least partially upon the determined damage status.

Exemplary Computing Device

Figure 6:
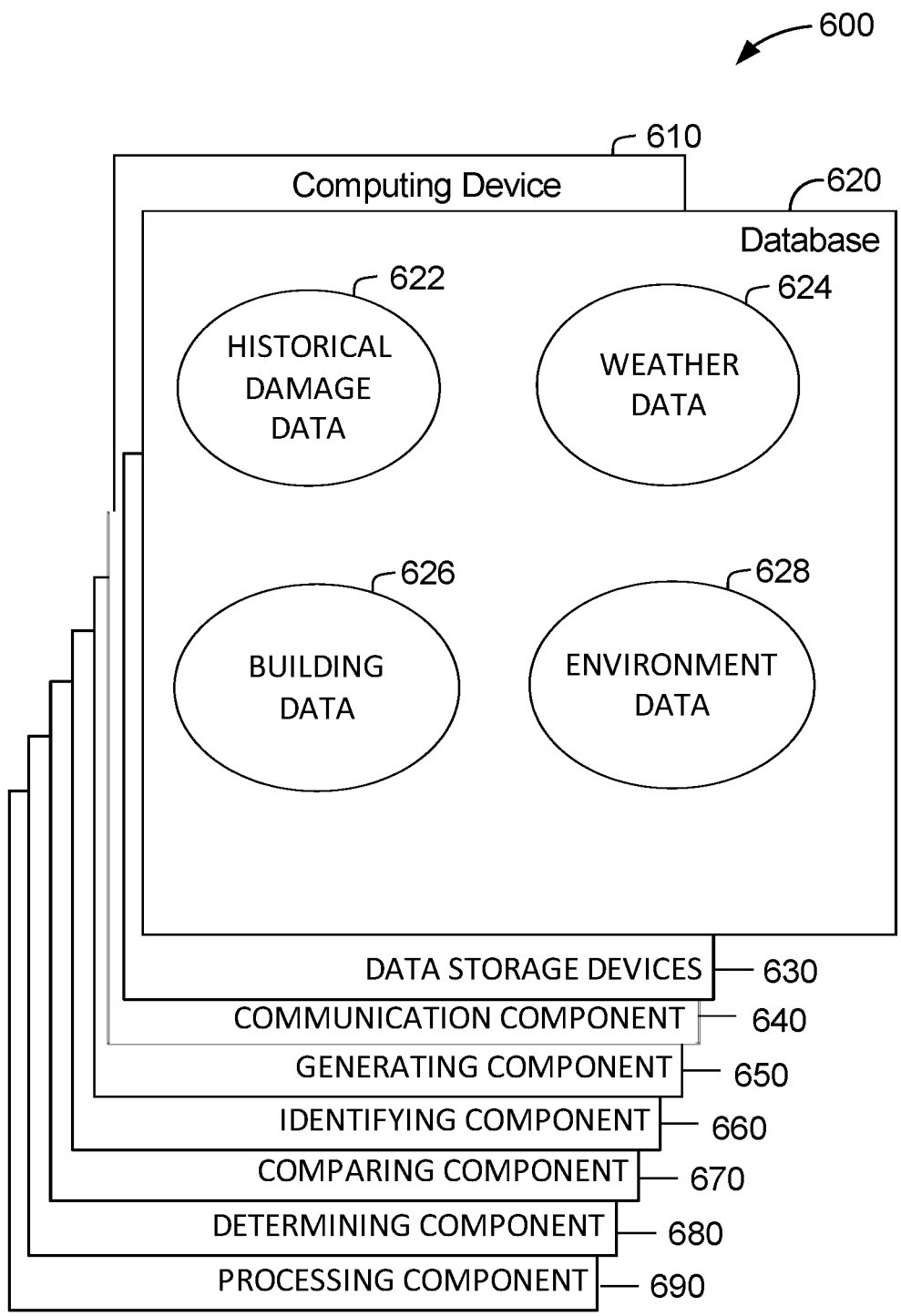
FIG. 6 illustrates a diagram of components of one or more exemplary computing devices that may be used in the system shown in FIG. 1.

FIG. 6 depicts a diagram 600 of components of one or more exemplary computing devices 610 that may be used in system 100 shown in FIG. 1. In some embodiments, computing device 610 may be similar to DA computing device 102 (shown in FIG. 1). Database system 620 may be coupled with several separate components within computing device 610, which perform specific tasks. Database system 620 may include a plurality of distributed databases that store specific types of data, such as historical database 108, building database 110, and/or weather database 214 (shown in FIGS. 1 and 2). In this embodiment, database 620 system may include historical damage data 622, weather data 624, building data 626, and/or environment data 628.

Computing device 610 may include database system 620, as well as data storage devices 630. Computing device 610 may also include a communication component 640 for retrieving 502 historical damage data and/or retrieving 508 damage data associated with a building (both shown in FIG. 5). Computing device 610 may further include a generating component 650 for generating 504 a damage model for the building based upon the historical damage data (shown in FIG. 5). Computing device 610 may include an identifying component 660 for identifying 506 the building for roof damage assessment and/or a comparing component 670 for comparing 510 the damage data to the damage model (both shown in FIG. 5). Computing device 610 further comprises a determining component 680 for determining 512 a damage status of the building based up the comparison 510 (shown in FIG. 5). A processing component 690 may assist with execution of computer-executable instructions associated with the system.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A damage assessment (DA) computing device for determining roof damage of a building, wherein the DA computing device is communicatively coupled to a weather database configured to store weather event parameters for a plurality of weather events and to a building database configured to store building profiles for a plurality of buildings including the building, the DA computing device comprising at least one processor and a memory communicatively coupled to the at least one processor, wherein the at least one processor is programmed to:

retrieve historical damage data associated with a plurality of historical damage incidents for a respective plurality of buildings from a historical damage database, the historical damage data including respective historical damage parameters for each historical damage incident, the historical damage parameters including one or more building parameters associated with a respective damaged building, one or more weather parameters of a respective historical weather event in which the respective damaged building was damaged, and a known damage status representing an extent of damage to the damaged building following the historical weather event;

train a machine learning damage model using the historical damage parameters as an input set, the trained damage model including a plurality of predictive model parameters;

identify a building for a roof damage assessment by:
  detecting the upcoming weather event in a geographic region including the building by accessing the weather database; and
  performing a lookup in the building database using an identifier of the geographic region to identify a subset of the plurality of buildings that are located within the geographic region and are susceptible to potential damage from the upcoming weather event, the subset of the plurality of buildings including the building;

retrieve, from the weather and building databases, damage data associated with a roof of the building, the damage data including a plurality of damage parameters including weather event parameters of the upcoming weather event and building parameters of the building;

input the plurality of damage parameters to the trained damage model, which compares the plurality of damage parameters to the model parameters;

receive a model output from the trained damage model, the model output including a damage status of the roof representing the extent of damage to the roof;

transmit a notification to a user associated with the building, the notification including an indicator of the extent of damage to the roof and a proposed remedial action based upon the model output;

update the historical damage parameters stored in the historical damage database by storing the model output in the historical damage database; and re-train the machine learning damage model using the update historical damage parameters as an updated input set.

2. The DA computing device of claim 1, wherein the at least one processor is further programmed to:
  upon receiving the model output including the damage status of the roof, retrieve contact information for the user; and
  transmit, using the retrieved contact information, the notification to the user.

3. The DA computing device of claim 1, wherein the at least one processor is further programmed to transmit the notification further including, when the extent of damage is below a threshold, (i) the proposed remedial action including providing, by the user, additional information, and (ii) an interactive link that is configured to, upon selection by the user, automatically initiate an insurance claim process at a user computing device operated by the user.

4. The DA computing device of claim 1, wherein the at least one processor is further programmed to:
  when the extent of damage is above a predefined threshold, automatically pre-populate an insurance claim for an insurance policy associated with the building, wherein the insurance claim includes the damage status and at least one damage parameter; and
  transmit the notification to the user, the notification including (i) the proposed remedial action including initiating an insurance claim process based upon the automatically pre-populated insurance claim, and (ii) a control for the user to confirm initiation of the insurance claim process using the automatically pre-populated insurance claim.

5. The DA computing device of claim 4, wherein the notification further includes a prompt for the user associated with the building to provide a set of additional damage parameters for the damage data.

6. The DA computing device of claim 5, wherein the at least one processor is further programmed to:
  receive image data associated with the building from the user in response to the prompt;
  analyze the image data to identify at least one point of interest;
  extract the set of additional damage parameters from the image data based at least partially upon the analysis;
  input the set of additional damage parameters into the trained damage model; and
  receive an updated model output from the trained damage model, the updated model output including an updated damage status of the roof.

7. The DA computing device of claim 1, wherein the DA computing device is communicatively coupled to at least one sensor associated with the building, wherein the at least one sensor is configured to collect sensor data associated with the roof and wherein the at least one processor is further programmed to receive a set of additional damage parameters for the damage data from the at least one sensor.

8. The DA computing device of claim 1, wherein the at least one processor is further programmed to retrieve the building parameters of the building from the building database, wherein the building parameters are retrieved from a building profile associated with the building.

9. The DA computing device of claim 1, wherein the at least one processor is further programmed to:
  execute the trained damage model by:
    comparing each damage parameter of the plurality of damage parameters for the roof of the building with a corresponding model parameter of the damage model;
    generating a respective parameter score for each comparison;
    generating a confidence score as a function of the plurality of parameter scores, wherein the confidence score is a quantitative indicator of: (i) a likelihood that damage has occurred to the roof of building, and (ii) the extent of the damage;
    comparing the confidence score to at least one damage threshold, wherein the at least one damage threshold defines a plurality of score ranges; and
    determining the damage status of the building for output based upon which score range of the plurality of score ranges includes the confidence score.

10. The DA computing device of claim 1, wherein the at least one processor is further programmed to:
  when the extent of damage is below a predefined threshold, transmit the notification including (i) the proposed remedial action including providing, by the user, additional information, and (ii) an interactive link that is configured to, upon selection by the user, initiate an insurance claim process at a user computing device operated by the user, the insurance claim process based upon the additional information provided by the user;
  when the extent of damage exceeds a predefined threshold:
    automatically pre-populate an insurance claim for an insurance policy associated with the building, wherein the insurance claim includes the damage status and at least one damage parameter; and
    transmit the notification to the user, the notification including (i) the proposed remedial action including initiating an insurance claim process based upon the automatically pre-populated insurance claim, and (ii) a control for the user to confirm initiation of the insurance claim process using the automatically pre-populated insurance claim.

11. The DA computing device of claim 10, wherein the extent of damage below the predefined threshold is associated with one damage status indicating no repairs are recommended, and wherein the extent of the damage exceeding the predefined threshold is associated with another damage status indicating repairs are recommended.

12. The DA computing device of claim 10, wherein the DA computing device is communicatively coupled to an insurance computing device configured to perform the insurance claim process, and wherein the at least one processor is further programmed to, upon receipt, from the user, of confirmation of initiation of the insurance claim process, transmit the automatically pre-populated insurance claim to the insurance computing device for automatic processing.

13. A computer-based method for determining damage of a roof, said method comprising:
  retrieving, by a damage assessment (DA) computing device, historical damage data associated with a plurality of historical damage incidents for a respective plurality of buildings from a historical damage database, the historical damage data including respective historical damage parameters for each historical damage incident, the historical damage parameters including building parameters associated with a respective damaged building, weather parameters of a respective historical weather event in which the respective damaged building was damaged, and a known damage status representing an extent of damage to the damaged building following the historical weather event, wherein the DA computing device is communicatively coupled to a weather database configured to store weather event parameters for a plurality of weather events and to a building database configured to store building profiles for a plurality of buildings including the building;
  training, by the DA computing device, a machine learning damage model using the historical damage parameters as an input set, the trained damage model including a plurality of predictive model parameters;
  identifying a building for a roof damage assessment by:
    detecting the upcoming weather event in a geographic region including the building by accessing the weather database; and
    performing a lookup in the building database using an identifier of the geographic region to identify a subset of the plurality of buildings that are located within the geographic region and are susceptible to potential damage from the upcoming weather event, the subset of the plurality of buildings including the building;

retrieving, from the weather and building databases, damage data associated with a roof of the building, the damage data including a plurality of damage parameters including weather event parameters of the upcoming weather event and building parameters of the building;

inputting, by the DA computing device, the plurality of damage parameters to the damage model, which compares the plurality of damage parameters to the model parameters;

receiving, by the DA computing device, a model output from the trained damage model, the model output including a damage status of the roof representing the extent of damage to the roof;

transmitting, by the DA computing device, a notification to a user associated with the building, the notification including an indicator of the extent of damage to the roof and a proposed remedial action based upon the model output;

updating, by the DA computing device, the historical damage parameters stored in the historical damage database by storing the model output in the historical damage database; and re-training, by the DA computing device, the machine learning damage model using the update historical damage parameters as an updated input set.

14. The method of claim 13 further comprising:

upon receiving the model output including the damage status of the roof, retrieving contact information for the user; and transmitting, by the DA computing device using the retrieved contact information, the notification to the user.

15. The method of claim 13, wherein transmitting, by the DA computing device, the notification to the user further comprises transmitting the notification further including, when the extent of damage is below a threshold, (i) the proposed remedial action including providing, by the user, additional information, and (ii) an interactive link that is configured to, upon selection by the user, automatically initiate an insurance claim process at a user computing device operated by the user.

16. The method of claim 13, further comprising:

when the extent of damage is above a predefined threshold, automatically pre-populating an insurance claim for an insurance policy associated with the building, wherein the insurance claim includes the damage status at least one damage parameter; and transmitting the notification to the user, the notification including (i) the proposed remedial action including initiating an insurance claim process based upon the automatically pre-populated insurance claim, and (ii) a control for the user to confirm initiation of the insurance claim process using the automatically pre-populated insurance claim.

17. The method of claim 16, further comprising prompting the user associated with the building to provide a set of additional damage parameters for the damage data in response to receiving the insurance claim.

18. The method of claim 13, wherein the DA computing device is communicatively coupled to at least one sensor associated with the building, wherein the at least one sensor is configured to collect sensor data associated with the roof, the method further comprising receiving, by the DA computing device, a set of additional damage parameters for the damage data from the at least one sensor of the building.

19. The method of claim 13, further comprising retrieving, by the DA computing device, the building parameters of the building from the building database, wherein the building parameters are retrieved from a building profile associated with the building.

20. The method of claim 13, further comprising executing the trained damage model by:

comparing each damage parameter of the plurality of damage parameters for the roof of the building with a corresponding model parameter of the damage model;

generating a respective parameter score for each comparison;

generating, by the DA computing device, a confidence score as a function of the plurality of parameter scores, wherein the confidence score is a quantitative indicator of: (i) a likelihood that damage has occurred to the roof of building, and (ii) the extent of the damage;

comparing the confidence score to at least one damage threshold, wherein the at least one damage threshold defines a plurality of score ranges; and determining the damage status of the building for output based upon which score range of the plurality of score ranges includes the confidence score.

21. At least one non-transitory computer-readable storage media having computer-executable instructions embodied thereon, wherein when executed by at least one processor of a damage assessment (DA) computing device, the computer-executable instructions cause the processor to:

retrieve historical damage data associated with a plurality of historical damage incidents for a respective plurality of buildings from a historical damage database, the historical damage data including respective historical damage parameters for each historical damage incident, the historical damage parameters including building parameters associated with a respective damaged building, weather parameters of a respective historical weather event in which the respective damaged building was damaged, and a known damage status representing an extent of damage to the damaged building following the historical weather event, wherein the processor is communicatively coupled to a weather database configured to store weather event parameters for a plurality of weather events and to a building database configured to store building profiles for a plurality of buildings including the building;

train a machine learning damage model using the historical damage parameters as an input set, the trained damage model including a plurality of predictive model parameters;

identify a building for a roof damage assessment by:

detecting the upcoming weather event in a geographic region including the building by accessing the weather database; and performing a lookup in the building database using an identifier of the geographic region to identify a subset of the plurality of buildings that are located within the geographic region and are susceptible to potential damage from the upcoming weather event, the subset of the plurality of buildings including the building;

retrieve, from the weather and building databases, damage data associated with a roof of the building, the damage data including a plurality of damage parameters including weather event parameters of the upcoming weather event and building parameters of the building;

input the plurality of damage parameters to the trained damage model, which compares the plurality of damage parameters to the model parameters;

receive a model output from the trained damage model, the model output including a damage status of the roof representing the extent of damage to the roof;

transmit a notification to a user associated with the building, the notification including an indicator of the extent of damage to the roof and a proposed remedial action based upon the model output;

update the historical damage parameters stored in the historical damage database by storing the model output in the historical damage database; and re-train the machine learning damage model using the update historical damage parameters as an updated input set.

22. The computer-readable storage media of claim 21, wherein the computer-executable instructions further cause the processor to:

upon receiving the model output including the damage status of the roof, retrieve contact information for the user; and transmit, using the retrieved contact information, the notification to the user.

23. The computer-readable storage media of claim 22, wherein the computer-executable instructions further cause the processor to transmit the notification further including, when the extent of damage is below a threshold, (i) the proposed remedial action including providing, by the user, additional information, and (ii) an interactive link that is configured to, upon selection by the user, automatically initiate an insurance claim process at a user computing device operated by the user.

24. The computer-readable storage media of claim 21, wherein the computer-executable instructions further cause the processor to:

when the extent of damage is above a predefined threshold, automatically pre-populate an insurance claim for an insurance policy associated with the building, wherein the insurance claim includes the damage status and at least one damage parameter; and transmit the notification to the user, the notification including (i) the proposed remedial action including initiating an insurance claim process based upon the automatically pre-populated insurance claim, and (ii) a control for the user to confirm initiation of the insurance claim process using the automatically pre-populated insurance claim.

25. The computer-readable storage media of claim 24, wherein the notification further includes a prompt for the user associated with the building to provide a set of additional damage parameters for the damage data.

26. The computer-readable storage media of claim 21, wherein the DA computing device is communicatively coupled to at least one sensor associated with the building, wherein the at least one sensor is configured to collect sensor data associated with the roof and wherein the computer-executable instructions further cause the processor to receive a set of additional damage parameters for the damage data from the at least one sensor.

27. The computer-readable storage media of claim 21, wherein the computer-executable instructions further cause the processor to retrieve the building parameters of the building from the building database, wherein the building parameters are retrieved from a building profile associated with the building.

28. The computer-readable storage media of claim 21, wherein the computer-executable instructions further cause the processor to:

execute the trained damage model by:

comparing each damage parameter of the plurality of damage parameters for the roof of the building with a corresponding model parameter of the damage model;

generating a respective parameter score for each comparison;

generating a confidence score as a function of the plurality of parameter scores, wherein the confidence score is a quantitative indicator of: (i) a likelihood that damage has occurred to the roof of building, and (ii) the extent of the damage;

comparing the confidence score to at least one damage threshold, wherein the at least one damage threshold defines a plurality of score ranges; and determining the damage status of the building for output based upon which score range of the plurality of score ranges includes the confidence score.

* * * * *